(12) United States Patent
Glaab

(10) Patent No.: US 12,473,055 B2
(45) Date of Patent: Nov. 18, 2025

(54) METHOD AND APPARATUS FOR REMOVING LIQUID FROM, AND PUMPING SLUSH ICE TO, A HOLD ON A FISHING VESSEL

(71) Applicant: Circle Seafoods, Inc., Portland, OR (US)

(72) Inventor: Gene Patrick Glaab, Sitka, AK (US)

(73) Assignee: Circle Seafoods Inc., Aberdeen, WA (US)

( * ) Notice: Subject to any disclaimer, the term of this patent is extended or adjusted under 35 U.S.C. 154(b) by 35 days.

(21) Appl. No.: 18/657,671

(22) Filed: May 7, 2024

(65) Prior Publication Data
US 2024/0391562 A1 Nov. 28, 2024

Related U.S. Application Data

(62) Division of application No. 18/323,321, filed on May 24, 2023, now Pat. No. 12,006,001.

(51) Int. Cl.
| | | |
|---|---|---|
| *B63B 35/24* | (2006.01) | |
| *B63B 25/26* | (2006.01) | |
| *B63B 27/34* | (2006.01) | |

(52) U.S. Cl.
CPC ............ *B63B 27/34* (2013.01); *B63B 25/26* (2013.01); *B63B 35/24* (2013.01)

(58) Field of Classification Search
CPC .......... F16K 19/00; B63B 25/26; B63B 35/24
See application file for complete search history.

(56) References Cited

U.S. PATENT DOCUMENTS

| | | |
|---|---|---|
| 5,005,364 A | 4/1991 | Nelson |
| 8,801,856 B2 | 8/2014 | Burrows et al. |
| 8,905,062 B2 | 12/2014 | Menet |
| 2008/0230132 A1 | 9/2008 | Cowan |

OTHER PUBLICATIONS

Non-Final Office Action for U.S. Appl. No. 18/323,321, mailed Aug. 21, 2023, 11 pages.
Notice of Allowance for U.S. Appl. No. 18/323,321, mailed Feb. 14, 2024, 9 pages.

*Primary Examiner* — Paul J Gray
(74) *Attorney, Agent, or Firm* — Elliott, Ostrander & Preston, P.C.

(57) ABSTRACT

An apparatus includes a pipe tee with an inlet proximate a first valve, an outlet proximate a second valve, and an inlet-outlet. The inlet receives slush ice when the first valve is open and the second valve is closed. The outlet transmits fluid when the second valve is open and the first valve is closed. The inlet-outlet receives fluid when the second valve is open and the first valve is closed and transmits slush ice when the first valve is open and the second valve is closed. A second pipe tee has an inlet coupled to the outlet of the pipe tee that receives fluid when the second valve is open and the first valve is closed, a first outlet that transmits water, separated from the fluid, when the second valve is open and the first valve is closed, and a second outlet that transmits air, separated from the fluid, when the second valve is open and the first valve is closed.

9 Claims, 4 Drawing Sheets

100

METHOD AND APPARATUS FOR REMOVING LIQUID FROM, AND PUMPING SLUSH ICE TO, A HOLD ON A FISHING VESSEL

CROSS-REFERENCE TO RELATED APPLICATIONS

This application is a divisional of U.S. patent application Ser. No. 18/323,321, filed on May 24, 2023, the entire contents of which are hereby incorporated by reference herein.

TECHNICAL FIELD

Embodiments of the invention relate to a method and apparatus on a fish tender vessel that can first empty liquid waste from a hold of a nearby fishing vessel and then fill the hold with slush ice.

BACKGROUND

Conventionally, fishing boats, or fishing vessels, gather periodically to unload their catch of fish to a receiving tender boat or barge, sometimes known as a mothership, hereinafter referred to as a fish tender vessel. A fish tender vessel may be more formally described as a vessel that commercially supplies, stores, refrigerates, or transports fish, fish products, or materials directly related to fishing or the preparation of fish to or from a fishing, fish processing, or fish tender vessel or a fish processing facility. The fishing vessels float or follow behind one another in a current of a body of seawater, or in a current of the fish tender vessel while underway, awaiting their turn to tie up adjacent to the fish tender vessel and unload their catch of fish to the fish tender vessel, and optionally to take on provisions or supplies, such as fuel or slush ice from the fish tender vessel.

Slush ice is often loaded and stored in a storage compartment, i.e., a hold, on a fishing vessel and used for preserving the fishing vessel's catch of fish until the fish can be unloaded from the hold to, for example, a fish tender vessel. When taking on slush ice from the fish tender vessel, often the fishing vessel's hold already has liquid, such as melted water left over from previous provisioning of slush ice, in the hold. That liquid needs to be removed first before storing fresh slush ice in the hold. Traditionally, fishing vessels each carry and operate their own equipment to pump liquid out of the hold, such as a vacuum pump and a hose, as well as their own equipment to pump slush ice into the hold, such as a slush pump and hose. The hose used to pump liquid out of the hold may be repurposed to pump slush ice into the hold as well but requires the crew to disconnect the hose from the vacuum pump and then connect it to the slush pump. Of course, it is redundant and expensive for each fishing vessel to maintain their own pumps and hoses and requires the training and involvement of each fishing vessel's crew to operate the equipment. Furthermore, if one or more of the fishing vessels' vacuum pump, slush pump, and hose, lacks sufficient capacity to do the job quickly and efficiently, or breaks down, the process of unloading fish from, and loading provisions on to, fishing vessels queued up at the fishing tender vessel can slow down or even come to a halt.

BRIEF DESCRIPTION OF THE DRAWINGS

Embodiments of the present disclosure are illustrated by way of example, and not by way of limitation, and can be more fully understood with reference to the following detailed description when considered in connection with the figures in which.

DETAILED DESCRIPTION

According to embodiments of the invention, an apparatus mounted on a deck of a fish tender vessel, or a mobile apparatus mounted to a standard hatch cover that can be positioned over the opening of a hold of the fish tender vessel in which slush ice is stored, can be used to both pump liquid from the hold of a nearby fishing vessel and pump slush ice, for example, from the hold of the fish tender vessel, into the hold of the nearby fishing vessel. The nearby fishing vessel may be, for example, docked or anchored next to the fish tender vessel, or may be tied to the fishing tender vessel for the purpose of unloading fish to the fish tender vessel and/or loading supplies from the fish tender vessel to the fishing vessel.

Figure 1:
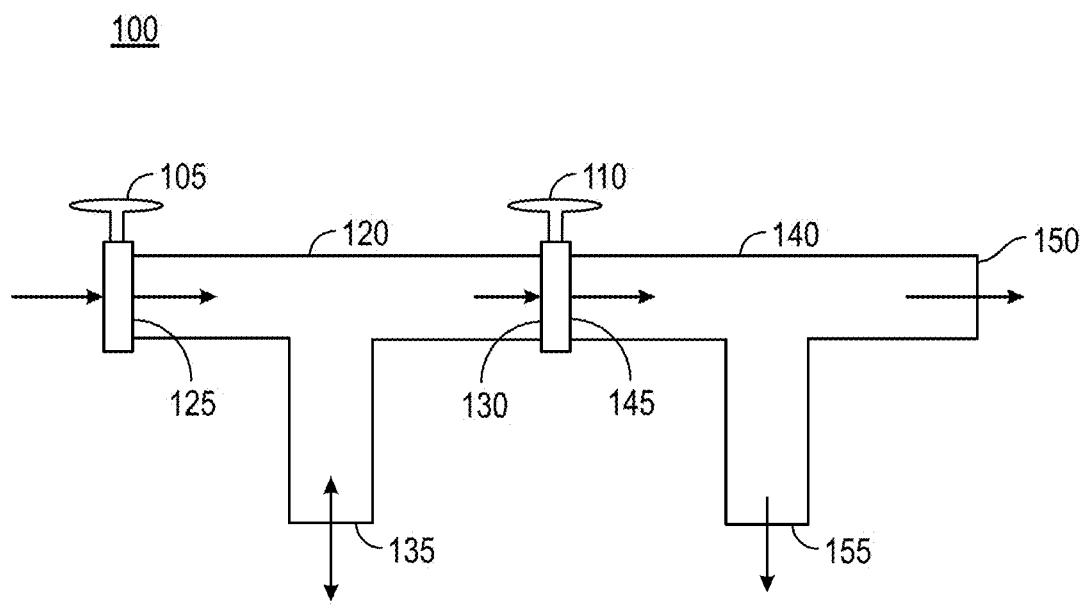
FIG. 1 illustrates a functional block diagram of aspects of an embodiment of the invention.

FIG. 1 is a functional block diagram of mechanical aspects of an apparatus that may be used on a fish tender vessel, a fish processing facility, or a barge (hereinafter, "the vessel") to both pump liquid from a hold of a nearby fishing vessel and pump fresh slush ice from the fish tender vessel to the nearby fishing vessel, according to embodiments of the invention. The apparatus 100 has a first pipe valve (or simply, "valve") 105, and a second valve 110. The apparatus 100 further includes a first pipe tee 120 comprising an inlet 125 proximate the first valve 105, an outlet 130 proximate the second valve 110, and an inlet-outlet 135 (with no corresponding or proximate valve). While the pipe valves depicted in FIG. 1 have handles by which the valves can be manually opened and closed, it is appreciated that the valves could be automated or electronically controlled, as described further below. According to one embodiment, the valves are ball-valves, but other types of valves are also contemplated according to other embodiments, such as gate-valves, butterfly valves, check valves, diaphragm valves, pinch valves, plug valves, globe valves, etc.

Figure 3:
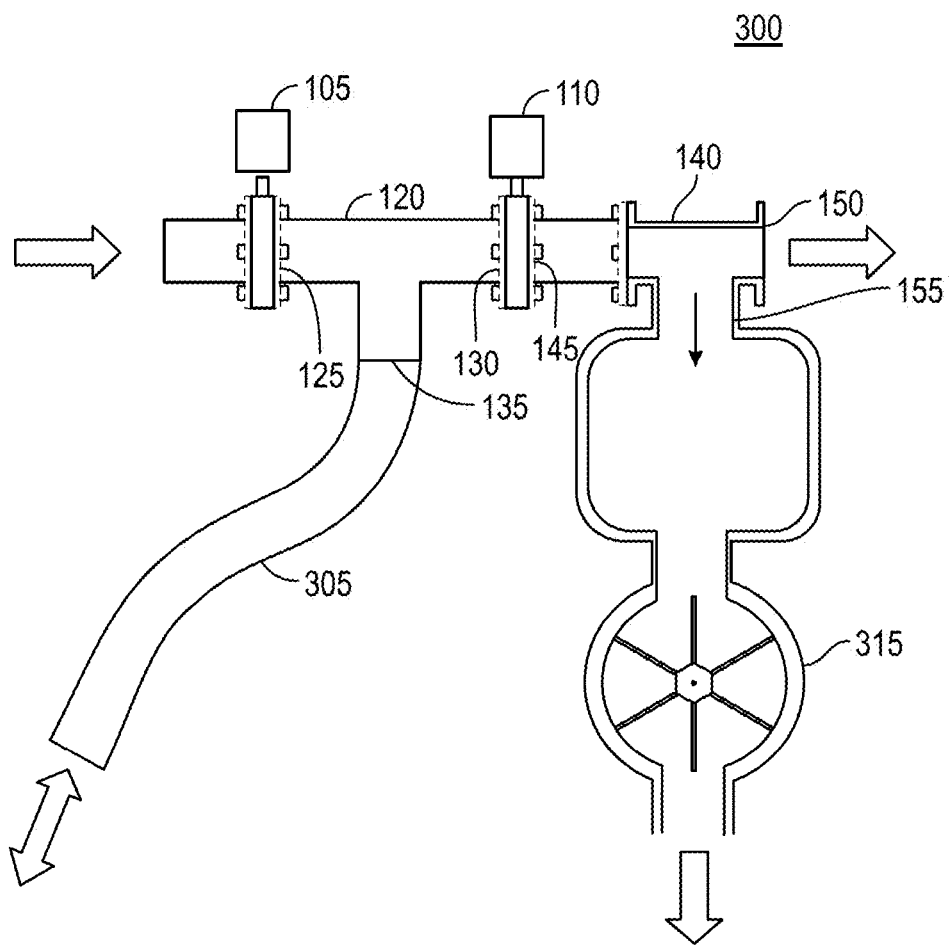
FIG. 3 illustrates an embodiment of the invention.

According to one embodiment 300, with reference to FIG. 3, the inlet 125 of pipe tee 120 is coupled to a pipe and/or hose that extends to a source for slush ice on the fish tender vessel, for example, a hold of the fish tender vessel where slush ice is stored. The inlet 125 of pipe tee 120 can thus receive slush ice from the slush ice source when the first valve 105 is open. The inlet-outlet 135 of pipe tee 120 is coupled to a pipe and/or hose 305 that extends to the nearby fishing vessel, or a hold of the nearby fishing vessel. The slush ice can thus be delivered to the nearby fishing vessel via inlet 125 and inlet-outlet 135 of pipe tee 120 when the first valve 105 is open and the second valve 110 is closed.

However, ideally, and importantly, it is beneficial to first clean out any fluid or liquid in the hold of the nearby fishing vessel before delivering slush ice to that hold. To that end, the outlet 130 of pipe tee 120 can transmit a fluid comprising a mixture of air and liquid (e.g., water) from the fishing vessel's hold via inlet-outlet 135 and outlet 130 when the second valve 110 is open and the first valve 105 is closed.

According to embodiments, the apparatus further comprises a second pipe tee 140, which has an inlet 145 coupled to the outlet 130 of the first pipe tee 120 and proximate the second valve 110, to receive fluid from the fishing vessel's hold via inlet-outlet 135, outlet 130, and inlet 145 when the second valve 110 is open and the first valve 105 is closed. The second pipe tee 140 further includes a first outlet 155 to transmit water, separated from the fluid, that is received from the fishing vessel's hold via inlet-outlet 135, outlet 130, and inlet 145 when the second valve 110 is open and the first valve 105 is closed. Finally, the second pipe tee 140 includes a second outlet 150 to transmit the air, separated from the fluid, that is received from the fishing vessel's hold via inlet-outlet 135, outlet 130, and inlet 145 when the second valve 110 is open and the first valve 105 is closed.

As noted above, with reference to FIG. 4, an apparatus 400 according to the described embodiments may employ electronically controlled valves, in which case, the apparatus further comprises a controller 405 coupled in communication with the first and second electronically controlled valves 105, 110 to control their opening and closing as may be needed to pump fluid from a nearby fishing vessel, and to pump slush ice to the fishing vessel.

The apparatus further comprises a vacuum pump 410, according to an embodiment. In one embodiment, the vacuum pump may be a liquid or wet ring vacuum pump, available from various manufacturers. The vacuum pump 410 is coupled to outlet 150 of the second pipe tee 140 so that, when a hose that is connected to inlet 135 of pipe tee 120 is lowered into the hold of a nearby fishing vessel, and when the vacuum pump is turned on and in operation, the vacuum pump causes fluid from the nearby fishing vessel to be received at the inlet-outlet 135 of the first pipe tee 120, passed through outlet 130 of the first pipe tee 120 and the inlet 145 of the second pipe tee 140, when the second valve 110 is open and the first valve 105 is closed.

Figure 4:
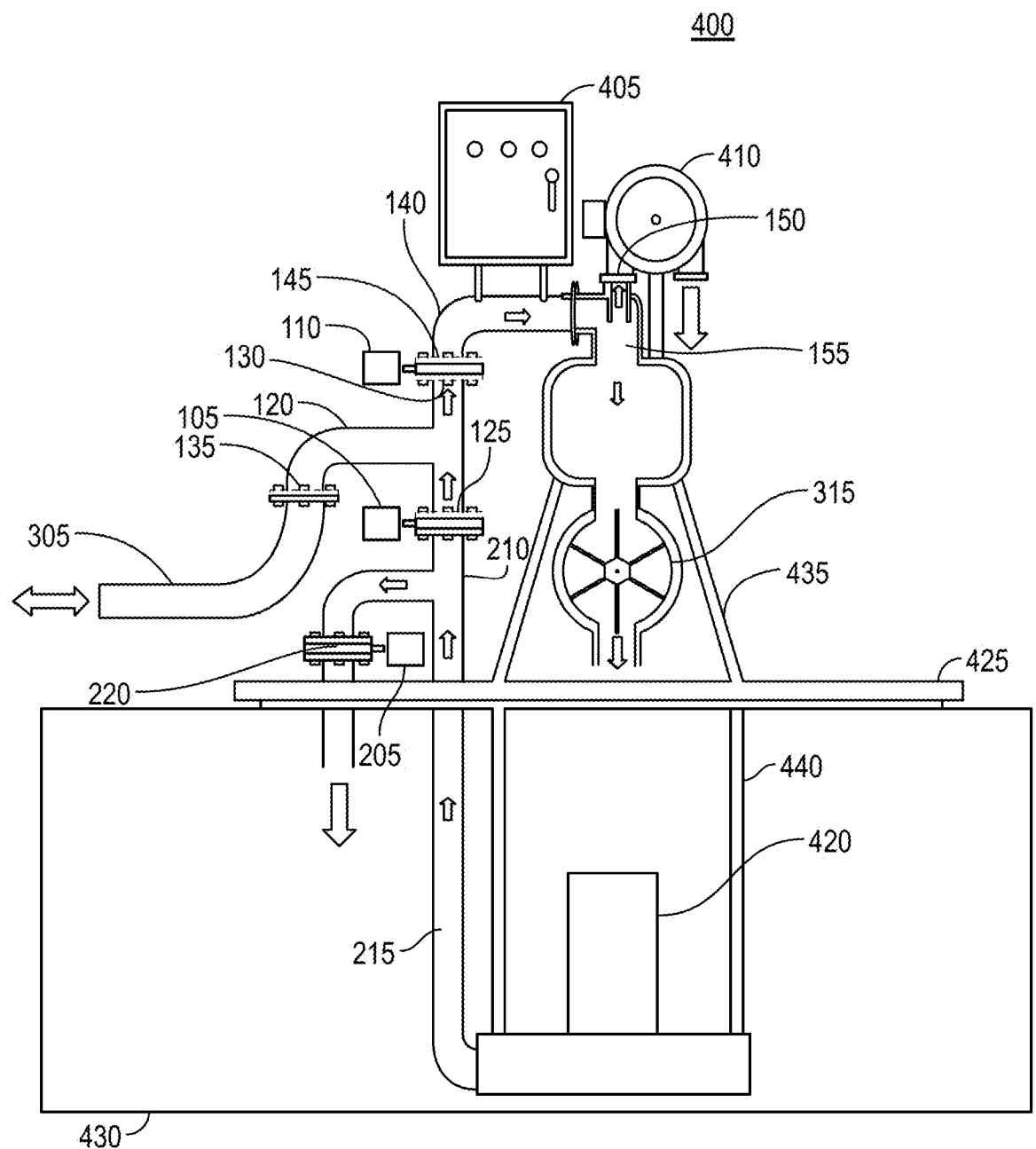
FIG. 4 illustrates an embodiment of the invention.

According to embodiments, with reference to FIGS. 3 and 4, the apparatus 300, 400 further comprises a water separator 315 coupled to the outlet 155 of the second pipe tee 140 to separate the fluid into a liquid (i.e., water) and air when the vacuum pump is in operation and when the second and valve 110 is open and the first valve 105 is closed.

According to embodiments, the apparatus further comprises a slush pump 420, coupled to the inlet 125 of the first pipe tee 120 so that, when in operation, the slush pump 420 causes slush ice to be pumped to and received at the inlet 125 of the first pipe tee 120, and then transmitted via the inlet-outlet 135 of the first pipe tee 120 and into the hold of the nearby fishing vessel, when the first valve 105 is open and the second valve 110 is closed. In one embodiment, the slush pump is a fish pump, for example, a herring pump, available from various manufacturers.

Figure 2:
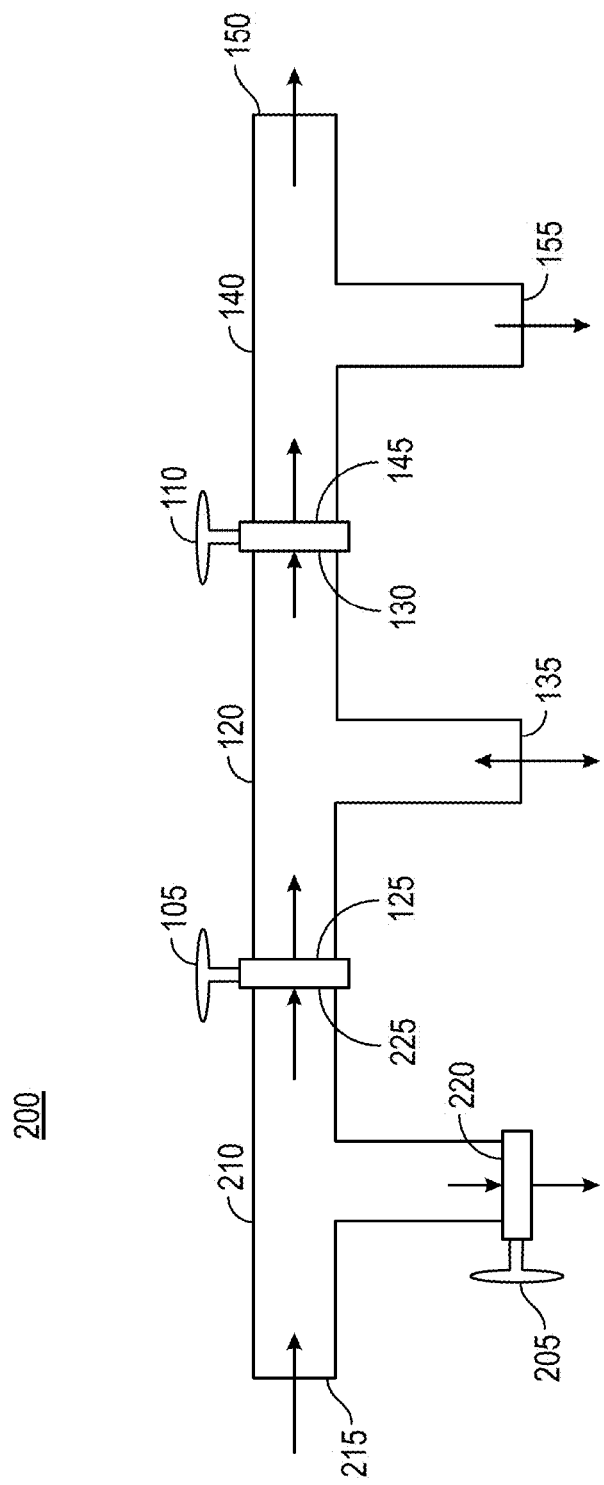
FIG. 2 illustrates a functional block diagram of aspects of an embodiment of the invention.

With reference to FIG. 2, according to embodiments of the invention, the apparatus 200 further comprises a third valve 205 and a third pipe tee 210. The third pipe tee 210 has an inlet 215 to receive slush ice from a slush ice source, such as from a hold of the fish tender vessel. The third pipe tee 210 has a first outlet 220 proximate the third valve 205 to transmit the slush ice back to the source when the third valve 205 is open and the first valve 105 is closed, as may be done when there is a need or desire to recirculate the slush ice in the hold of the fish tender vessel, for example, to maintain a desired mix, consistency, and/or temperature of the slush ice. The third pipe tee 210 also has a second outlet 225 coupled to the inlet 125 of the first pipe tee 120 and proximate the first valve 105 to transmit the slush ice when the first valve 105 is open and the second and third valves 110 and 205 are closed. In this manner, slush ice is pumped to the nearby fishing vessel via inlet-outlet 135 of first pipe tee 120, or through a hose or pipe connected to inlet-outlet 135 of first pipe tee 120 and extending down into the hold of the nearby fishing vessel.

According to this embodiment, the slush pump is coupled to the inlet 215 of the third pipe tee 210 (or to a hose that connects between the slush pump and inlet 215 of the third pipe tee 210). The second outlet 225 of the third pipe tee 210 is coupled to the inlet 125 of the first pipe tee 120, such that the slush pump, when in operation, causes the slush ice to be received at the inlet 215 of the third pipe tee 210, transmitted through the second outlet 225 of the third pipe tee 210, received at the inlet 125 of the first pipe tee 120, and transmitted through the inlet-outlet 135 of the first pipe tee 120, when the first valve 105 is open and the second valve 110 and the third valve 205 are closed.

The above-described embodiments contemplate the apparatus being mounted or fixed to a deck of the fish tender vessel. However, according to other embodiments, the apparatus may be a mobile apparatus that can be placed onto and operated by any fish tender vessel. For example, with reference to the embodiment 400 illustrated in FIG. 4, the apparatus may include a base 425 which functions as a hatch cover that is placed over a corresponding hatch opening in a hold 430 of a fish tender vessel, wherein the hold maintains the source of slush ice. The mobile apparatus includes a frame 435 attached to a top surface of the base 425, to which the first, second and third pipe tees 120, 140 and 210, and the vacuum pump 410 are mounted.

Another frame 440 is attached to a bottom surface of the base 425 and extends downward toward the bottom, or to the bottom, of the hold 430. Alternatively, frames 435 and 440 may be manufactured as a single frame that passes through the base 425. The slush pump 420 is mounted to the frame 440 and coupled to a power source and the controller 405, wherein the slush pump is capable of being submerged in the source of slush ice and operated to pump slush ice through a pipe or hose connected to inlet 215 of third pipe tee 210. In one embodiment, the power source, e.g., a motor, may be included in the mobile apparatus. Just like the apparatus illustrated in embodiment 300 in FIG. 3, the mobile apparatus illustrated in embodiment 400 in FIG. 4 may include electronically controlled first, second and third valves 105, 110, 205. A controller 405 is coupled in communication with the first, second and third electronically controlled valves to control their opening and closing.

The mobile apparatus further includes a vacuum pump 410 coupled to the second pipe tee 140, a power source, and the controller 405, such that, when in operation, the vacuum pump causes fluid from the hold of the nearby fishing vessel to be received at the inlet-outlet 135 of the first pipe tee 120, transmitted through the outlet 130 of the first pipe tee 120, and received at the inlet 145 of the second pipe tee 140, when the second valve 110 is open and the first valve 105 is closed.

According to an embodiment, a user interface is coupled to the controller 405 to receive input to the controller to control the opening and closing of the first, second and third electronically controlled valves, the operation of the vacuum pump, and the operation of the slush pump. In one embodiment, the user interface is a collection of electromechanical or electrical switches that may be manipulated by a user to control each of the first, second and third electronically controlled valves, the operation of the vacuum pump, and the operation of the slush pump. In another embodiment, the controller may comprise a programmable digital processor device, including, for example, a digital display device, a user input device, a processor, and software that displays prompts for user input on the digital display device and receives user input to control the various components of the mobile apparatus.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims that follow. Features of the disclosed embodiments can be combined and rearranged in various ways.

What is claimed is:

1. A method, comprising:
    receiving slush ice at an inlet of a first pipe tee proximate a first pipe valve while the first valve is open and a second pipe valve proximate an outlet of the first pipe tee is closed;
    transmitting a fluid comprising air and water via the outlet of the first pipe tee while the second valve is open and the first valve is closed;
    receiving the fluid via an inlet-outlet of the first pipe tee while the second valve is open and the first valve is closed;
    transmitting the slush ice while the first valve is open and the second valve is closed;
    receiving the fluid at an inlet of a second pipe tee, coupled to the outlet of the first pipe tee and proximate the second valve, while the second valve is open and the first valve is closed;
    transmitting water, separated from the fluid, via a first outlet of the second pipe tee, while the second valve is open and the first valve is closed;
    transmitting air, separated from the fluid, via a second outlet of the second pipe tee, while the second valve is open and the first valve is closed;
    causing, via a vacuum pump coupled to the second pipe tee, while the vacuum pump is in operation, the fluid to be received at the inlet-outlet of the first pipe tee, transmitted at the outlet of the first pipe tee, and received at the inlet of the second pipe tee, while the second valve is open and the first valve is closed; and
    separating, via a water separator coupled to the second pipe tee, the fluid into the water and the air while the vacuum pump is in operation and while the second valve is open and the first valve is closed.

2. The method of claim 1, wherein the first and second valves are electronically controlled valves; and
    the method further comprising controlling, via a controller coupled in communication with the first and second electronically controlled valves, opening and closing the first and second electronically controlled valves.

3. The method of claim 2, wherein the controller is further coupled in communication with the vacuum pump and the slush pump to control the respective operations thereof.

4. The method of claim 3, further comprising receiving user input at a user interface coupled to the controller to control the opening and closing of the first and second electronically controlled valves, the operation of the vacuum pump, and the operation of the slush pump.

5. The method of claim 1, further comprising:
    receiving slush ice at the inlet of the first pipe tee by operation of a slush pump coupled to the inlet of the first pipe tee; and
    transmitting by operation of the slush pump the slush ice via the inlet-outlet of the first pipe tee while the first valve is open and the second valve is closed.

6. The method of claim 5, further comprising:
    receiving the slush ice at an inlet of a third pipe tee;
    transmitting the slush ice back to a source via a first outlet proximate a third valve while the third valve is open and the first valve is closed;
    transmitting the slush ice via a second outlet coupled to the inlet of the first pipe tee and proximate the first valve while the first valve is open and the second and third valves are closed.

7. The method of claim 6, wherein the slush pump is further coupled to the inlet of the third pipe tee, the second outlet of which is coupled to the inlet of the first pipe tee, the method further comprising, by operation of the slush pump while the first and third valves are open and the second valve is closed:
    receiving the slush ice at the inlet of the third pipe tee;
    transmitting the slush ice at the second outlet of the third pipe tee;
    receiving the slush ice at the inlet of the first pipe tee; and
    transmitting the slush ice at the inlet-outlet of the first pipe tee.

8. The method of claim 7, wherein the first, second and third valves are electronically controlled valves; and
    the method further comprising controlling, via a controller coupled in communication with the first, second and third electronically controlled valves, opening and closing the first, second and third electronically controlled valves.

9. The method of claim 8, further comprising receiving user input at a user interface coupled to the controller to control the opening and closing of the first, second, and third electronically controlled valves, the operation of the vacuum pump and the operation of the slush pump.

* * * * *